United States Patent
Frashure et al.

(10) Patent No.: US 8,818,673 B1
(45) Date of Patent: Aug. 26, 2014

(54) METHOD TO DETECT MARGINALLY LARGE AIR GAPS ON HEAVY VEHICLE WHEEL SPEED SENSOR INSTALLATIONS

(71) Applicants: Timothy J. Frashure, Columbia Station, OH (US); Thomas J. Weed, North Ridgeville, OH (US); Craig S. Haehn, Avon Lake, OH (US); Kirit A. Thakkar, Parma, OH (US); Julie A. Miller, Lorain, OH (US); Daniel P. Zula, North Ridgeville, OH (US)

(72) Inventors: Timothy J. Frashure, Columbia Station, OH (US); Thomas J. Weed, North Ridgeville, OH (US); Craig S. Haehn, Avon Lake, OH (US); Kirit A. Thakkar, Parma, OH (US); Julie A. Miller, Lorain, OH (US); Daniel P. Zula, North Ridgeville, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 13/852,637

(22) Filed: Mar. 28, 2013

(51) Int. Cl.
*G06F 7/70* (2006.01)

(52) U.S. Cl.
USPC .......................................................... 701/70

(58) Field of Classification Search
None
See application file for complete search history.

(56) References Cited

U.S. PATENT DOCUMENTS

| | | | |
|---|---|---|---|
| 4,972,145 A | 11/1990 | Wood et al. | |
| 5,432,442 A | 7/1995 | Andersen | |
| 5,487,595 A | 1/1996 | Wise et al. | |
| 6,181,127 B1 | 1/2001 | Wallrafen | |
| 6,282,954 B1 | 9/2001 | Ott et al. | |
| 7,640,139 B2 * | 12/2009 | Sahara et al. | 702/183 |
| 2003/0141862 A1 | 7/2003 | Vig et al. | |
| 2010/0185414 A1 * | 7/2010 | Yamamoto | 702/183 |

FOREIGN PATENT DOCUMENTS

| | | |
|---|---|---|
| KR | 20010093925 A | 10/2001 |
| KR | 100358486 B1 | 10/2002 |
| KR | 20030021415 A | 3/2003 |
| KR | 20030047168 A | 6/2003 |

* cited by examiner

*Primary Examiner* — Thomas Tarcza
*Assistant Examiner* — Adam Alharbi
(74) *Attorney, Agent, or Firm* — Fay Sharpe LLP (57) ABSTRACT

When detecting unacceptably large airgaps between wheel speed sensors and their exciter rings on wheel ends of a vehicle, wheel speed sensor output is filtered and monitored to detect signal amplitudes that correspond to the airgaps. When signal peak amplitude below a predetermined threshold is detected, the airgap is too large. Wheel ends having unacceptably large air gaps are indicated to the driver or technician via blink sequences (e.g., on an electronic stability program (ESP) indicator light or other suitable indicator), wherein each wheel end is associated with a unique blink sequence.

28 Claims, 6 Drawing Sheets

METHOD TO DETECT MARGINALLY LARGE AIR GAPS ON HEAVY VEHICLE WHEEL SPEED SENSOR INSTALLATIONS

BACKGROUND

The present application finds particular application in vehicle speed sensor systems, particularly involving wheel speed sensor systems. However, it will be appreciated that the described techniques may also find application in other diagnostic systems, other vehicle monitoring systems, or other troubleshooting systems.

Some conventional wheel speed sensors are positioned proximate to an exciter ring. The wheel speed sensor is generally not fixed within its mounting location so that the wheel speed sensor position can be adjusted throughout the life of the wheel speed sensor to maintain an airgap between the exciter ring and wheel speed sensor surface, thereby mitigating damage due to wheel end wobble, for example. The wheel speed sensor generates an alternating voltage signal as the exciter ring passes the surface of the sensor. If an airgap between the sensor and the exciter ring is too large, the ABS unit cannot function and faults, and large airgaps cannot be detected until the ABS unit is no longer capable of reading the sensor signal. Another problem with conventional systems arises when an airgap between the sensor and the exciter ring is within acceptable tolerances at the factory but comes out of tolerance within a few miles of driving. This results in unnecessary warranty returns and the like, when in fact there is nothing wrong with the wheel speed sensor itself.

The present innovation provides new and improved systems and methods that facilitate detecting unacceptably large airgaps between wheel speed sensors and their exciter rings, which overcome the above-referenced problems and others.

SUMMARY

In accordance with one aspect, a method for performing an all-wheel marginally large airgap test (AWMLAT) comprises, upon test initiation, receiving a signal from each of a plurality of wheel speed sensors on a vehicle, the signal being indicative of a exciter ring sensed by the sensor. The method further comprises, for each wheel speed sensor: monitoring exciter ring frequency to determine whether exciter ring frequency is within a predetermined frequency range; when exciter ring frequency is within the predetermined frequency range, measuring wheel speed sensor signal amplitude; comparing the measured wheel speed sensor signal amplitude to a predetermined minimum amplitude that represents the maximum allowable airgap between the wheel speed sensor and the exciter ring; and identifying wheel ends for which the wheel speed sensor signal amplitude is less than the predetermined minimum amplitude as having an airgap that is larger than a predetermined acceptable airgap size. In accordance with another aspect, a processor that executes an all-wheel marginally large airgap test (AWMLAT) is configured to, upon test initiation, receive a signal from each of a plurality of wheel speed sensors on a vehicle, the signal being indicative of a exciter ring sensed by the sensor. The processor is further configured, for each wheel sensor, to: monitor exciter ring frequency to determine whether exciter ring frequency is within a predetermined frequency range; when exciter ring frequency is within the predetermined frequency range, measure wheel speed sensor signal amplitude; compare the measured wheel speed sensor signal amplitude to a predetermined minimum amplitude that represents the maximum allowable airgap between the wheel speed sensor and the exciter ring; and identify wheel ends for which the wheel speed sensor signal amplitude is less than the predetermined minimum amplitude as having an airgap that is larger than a predetermined acceptable airgap size. According to another aspect, a system that facilitates performing an all-wheel marginally large airgap test (AWMLAT) comprises an antilock brake system comprising a plurality of wheel speed sensors that respectively monitor a plurality of exciter rings; and an indicator light. The system further comprises a processor configured to, upon test initiation, receive a signal from each of a plurality of wheel speed sensors on a vehicle, the signal being indicative of a exciter ring sensed by the sensor. The processor is further configured, for each wheel sensor, to: monitor exciter ring frequency to determine whether exciter ring frequency is within a predetermined frequency range; when exciter ring frequency is within the predetermined frequency range, measure wheel speed sensor signal amplitude; compare the measured wheel speed sensor signal amplitude to a predetermined minimum amplitude that represents the maximum allowable airgap between the wheel speed sensor and the exciter ring; and identify wheel ends for which the wheel speed sensor signal amplitude is less than the predetermined minimum amplitude as having an airgap that is larger than a predetermined acceptable airgap size.

In accordance with another aspect, an apparatus for performing an all-wheel marginally large airgap test (AWMLAT) comprises receiving means for receiving a signal from each of a plurality of wheel speed sensors on a vehicle, the signal being indicative of a exciter ring sensed by the sensor. The apparatus further comprises, for each wheel speed sensor: monitoring means for monitoring exciter ring frequency to determine whether exciter ring frequency is within a predetermined frequency range; measuring means for, when exciter ring frequency is within the predetermined frequency range, measuring wheel speed sensor signal amplitude; comparing means for comparing the measured wheel speed sensor signal amplitude to a predetermined minimum amplitude that represents the maximum allowable airgap between the wheel speed sensor and the exciter ring; and identifying means for identifying wheel ends for which the wheel speed sensor signal amplitude is less than the predetermined minimum amplitude as having an airgap that is larger than a predetermined acceptable airgap size.

In accordance with another aspect, a method for performing wheel-end marginally large airgap test (WEMLAT), comprises, for each wheel on a vehicle, spinning a roller under the wheel for a predetermined number of revolutions within a preset speed range, and measuring wheel speed sensor output during spinning. The method further comprises requesting status and results for all wheels, and receiving status and result data. Additionally, the method comprises checking a predetermined status byte in the received data to determine the status of an airgap between the wheel speed sensor and an exciter ring coupled to the first wheel, and outputting to a user an indication of any wheels having an airgap that is larger than a predetermined allowable airgap threshold size.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The foregoing problems are overcome by the herein-described systems and methods, which employ a filter in conjunction with the analog-to-digital sampling capabilities of a microcontroller to determine a peak amplitude of the wheel speed sensor signal. The described systems and methods are directed to an antilock brake system that measures the wheel speed sensor signal peak amplitude as well as its frequency. The amplitude generally correlates to an airgap; the lower the amplitude, the larger the airgap between the sensor and the exciter ring.

Figure 1:
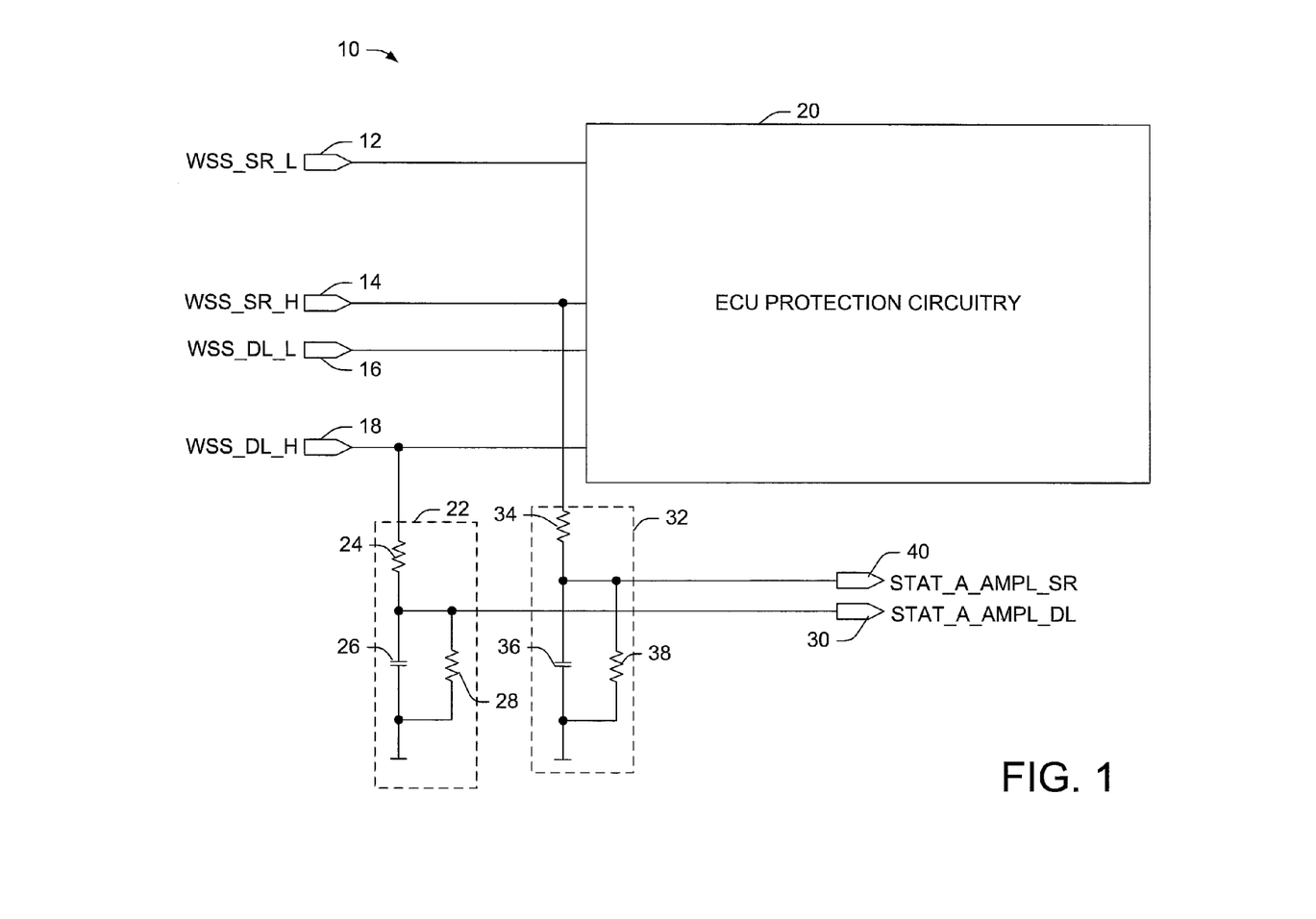
FIG. 1 illustrates a circuit that facilitates detecting a marginally large airgap between a wheel speed sensor (WSS) and an exciter ring.

FIG. 1 illustrates a circuit 10 that facilitates detecting a marginally large airgap between a wheel speed sensor (WSS) and an exciter ring or tone wheel. The circuit 10 includes a plurality of wheel speed sensor inputs, including a WSS_SR_L (wheel speed sensor_steering right_low) sensor 12 for a right side steering wheel, a WSS_SR_H (wheel speed sensor_steering right_high) sensor 14 for the right side steering wheel, a WSS_DL_L (wheel speed sensor_driving left_low) sensor 16 for a left side driving wheel, and a WSS_DL_H (wheel speed sensor_driving left_high) sensor 18 for the left side driving wheel, which are fed into engine control unit (ECU) protection circuitry 20. It will be appreciated that the illustrated wheel speed sensors are provided by way of example, and that the sensors and the wheels they monitor are not limited to those shown in FIG. 1.

Wheel speed data from sensor WSS_DL_H 18 is also passed through a low pass filter 22 comprising a resistor 24 (e.g., a 100 kΩ resistor or the like), and a capacitor 26 (e.g., a 10 nF capacitor or the like), and a resistor 28 (e.g., a 10 kΩ resistor or the like). The signal from the filter 22 is provided as wheel speed status peak amplitude output 30 (STAT_A_AMPL_DL). Wheel speed data from sensor WSS_SR_H 14 is also passed through a low pass filter 32 comprising a resistor 34 (e.g., a 100 kΩ resistor or the like), and a capacitor 36 (e.g., a 10 nF capacitor or the like), and a resistor 38 (e.g., a 10 kΩ resistor or the like). The signal from the filter 32 is provided as wheel speed status peak amplitude output 40 (STAT_A_AMPL_SR), which can be provided as input to a processor in a controller (e.g., an engine controller unit or ECU) or the like for analysis to determine whether the airgap between the sensor and the exciter ring is within acceptable tolerances. The low pass filter thus measures half of the wheel sensor signal (the voltage peak) to approximate the wheel sensor signal.

According to an example, an amplitude test is run at the end of line at the vehicle OEM or during a self-test initiated by the driver or technician. The desired wheel speed range in this example is between 2.5 mph and 10 mph for the amplitude test. The input circuit includes the low pass filters that connect the high wheel speed sensor signals to an analog to digital conversion (ADC) port on the microcontroller or processor (see the processor 302 of FIG. 6). The signal can be readily oversampled to obtain a minimum and a maximum peak amplitude with just a few rotations of the wheel. In one embodiment, the sampling rate is four times faster than the task execution cycle for the given processor. The measurements are stored over time to determine if the wheel speed sensor is maintaining the correct airgap or if it is moving further away from the exciter ring (i.e., the tone wheel). The instantaneous measurements can also indicate the presence of undesirable exciter ring wobble or runout. The diagnostic system can use the antilock braking system (ABS) and electronic stability program (ESP) lamps to indicate status when the airgap test is being run. If a wheel speed sensor has a peak amplitude that does not match the amplitude for the preferred airgap at the particular frequency, the diagnostic system can indicate the status to the driver or technician. The airgap can then be corrected before the wheel speed sensor signal amplitude is too low to be received or detected. In this manner, the available A/D processing on the microprocessor is used to process both the frequency and the amplitude of the wheel speed sensor signal to indicate an increasing airgap over time.

The wheel speed sensors may be, for example, variable reluctance wheel speed sensors that are used to perform the marginally-large airgap test (MLAT). The MLAT feature can operate in two modes: a stand-alone mode allows for concurrently testing all wheels (AWMLAT) using only the vehicle ABS system; and an end-of-line test mode allows for testing individual wheel-ends (WEMLAT) on a roller-bed dynamometer. "Marginally large" as used herein will be understood to be a function of the particular WSS being employed, as different sensors have different airgap tolerances. By way of example, a marginally large airgap for the wheel speed sensor is an airgap having a width of at least 0.03 in.

To help reduce wheel speed sensor (WSS) no-defect-found (NDF) warranty returns, it is desirable that all installations leaving OEM customer plants have minimal airgaps. One potential cause for WSS NDF warranty returns is marginally large airgaps. A sensor with a marginally large airgap may still be able to produce a signal with the minimum required amplitude for the ABS system to function at the end-of-line test. However, since the airgap would be marginally large, service over rough roads or an increase in wheel bearing play could cause the sensor to back out further. The ECU could report a fault for the large airgap and lead to unnecessary replacement of the sensor on the vehicle even though a cause of the issue was the airgap.

The described WEMLAT mode of the MLAT feature allows OEM customers to check each wheel-end's airgap on end-of-line roller beds (e.g., such as a Link-Radlinski® system) with finer tolerance than previously possible. The feature internally analyzes the amplitude for each wheel-end's sensor as the wheel spins on the roller bed. Based on the peak amplitude, a calculation is made to determine if the airgap is excessive and, the processor reports back a status to the roller-bed controller via the diagnostic link. Additionally, the AWMLAT mode of the MLAT feature offers stand-alone functionality for checking the sensor airgaps. The stand-alone function does not need a roller-bed or additional controllers to perform the check. Instead, the feature can be enabled by the vehicle driver through an interface on the dash, such as the brake controller diagnostic switch. Once enabled, the driver simply drives within the prescribed limits of the feature to check the airgaps. Once the check is complete, the ABS and ESP warning lamps are used to convey test results to the driver.

The peak amplitude from the wheel speed sensor depends on several factors. The gap between the sensor head and the exciter ring (i.e. the airgap) is the largest detractor from the signal amplitude. However, the signal amplitude also depends on several other variables, including but not limited to: the exciter ring's runout with respect to the sensor head; the type of speed sensor; the speed that the wheel is turning (i.e. slower speeds produce smaller amplitudes); the quality of the exciter ring material (i.e. ferrous content); the pitch between the exciter ring "teeth" (driven by the tone ring diameter); the height of the exciter ring "teeth"; etc. Larger-diameter exciter rings with "machined teeth", produce among the strongest amplitude signals. Small-diameter exciter rings with "stamped" teeth generate the weakest amplitude signal for a given speed and airgap. The MLAT feature requires no new ECU parameterization for different types of exciter rings. All exciter rings are expected to produce the same amplitude for a given speed. Poorer performing exciter rings will thus have less airgap allowance. In general, wheel ends with the "large diameter, machined tooth" exciter rings may be identified as having unacceptable airgaps if the total gap exceeds roughly 0.030 in (0.762 mm). The total gap includes both exciter ring run-out and the airgap itself. As expected, wheel ends with the "small diameter, stamped tooth" exciter rings may be flagged for unacceptable airgaps when the total gap exceeds roughly 0.015 in (0.381 mm).

Once the MLAT is enabled, either via the diagnostic link or through the stand-alone driver interface, the feature performs the airgap check when wheel-ends turn within the appropriate speed range. The speed range depends on the number of teeth in the exciter ring and the rolling circumference of the tire. Each wheel end's speed is evaluated prior to the amplitude check for that wheel. As an example, for wheel-ends with 100-tooth exciter rings and 512 revolutions-per mile tires, the criteria can include without limitation: Limit Value; Lower-Speed Limit (e.g., 1 mph); and Upper-Speed Limit (e.g., 8 mph). Additionally, if the vehicle speed exceeds a predetermined threshold speed (e.g., 10 mph), the ECU exits the airgap check completely.

In addition, each time a MLAT test is run, the results are recorded for later retrieval by a diagnostic computer or other means. In this manner, trends for an increasing airgap sizes at each wheel end can be monitored.

Figure 2:
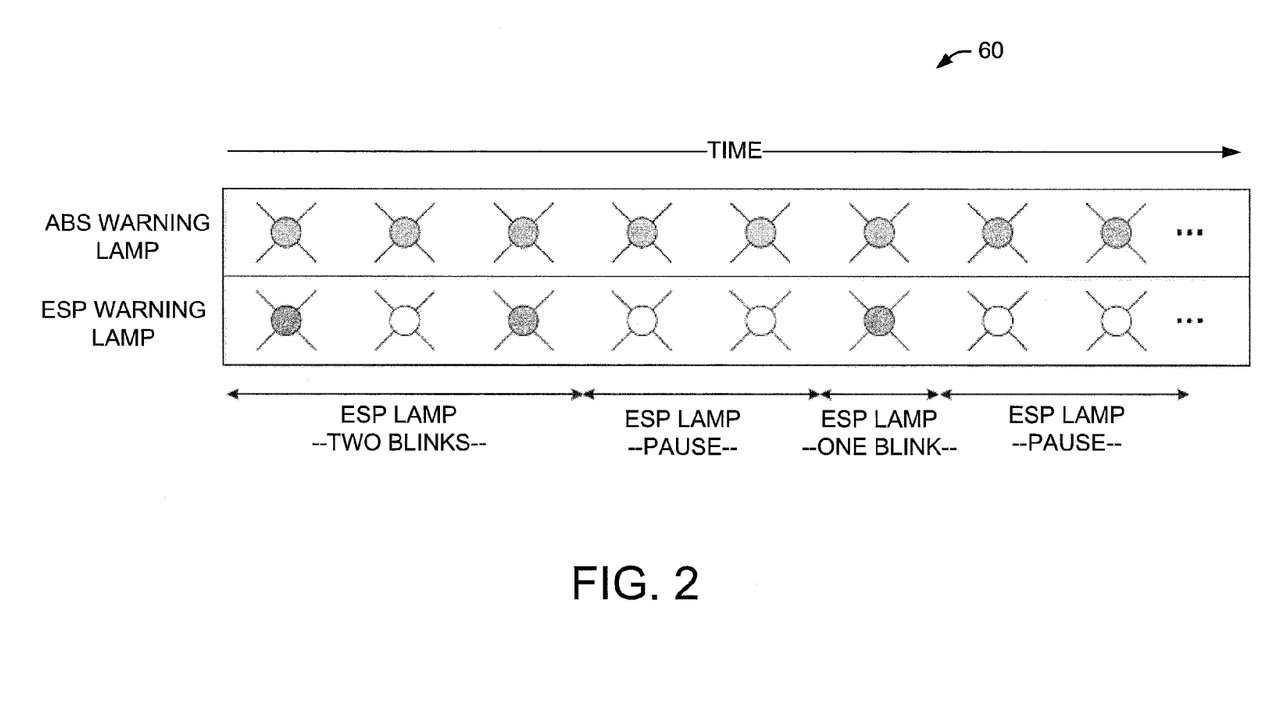
FIG. 2 illustrates an example of blink codes or sequences that can be display via the ABS and ESP lamps to provide information to a driver.

FIG. 2 illustrates an example of blink codes or sequences 60 that can be displayed via the ABS and ESP lamps to provide information to a driver. According to the figure, an ABS warning lamp is constantly illuminated, while an ESP warning lamp blinks in a predefined pattern. When performing the stand-alone all-wheel MLAT (AWMLAT), the MLAT feature can be used without a roller-bed dynamometer or additional diagnostic equipment (i.e. in "stand-alone mode"). The feature can be used prior to vehicle service to help maintenance staff diagnose wheel speed sensor issues. Additionally, the MLAT can be used after the vehicle has been serviced to make sure all wheel speed sensor airgaps are minimal. The test can be conducted on a level surface such as a parking lot or off-road course, at slow speeds. To perform the test, a driver ensures that the vehicle is stopped, and enters the MLAT mode by toggling the ABS Diagnostic switch a predetermined number of times (e.g., 8 or some other predetermined number) or by sending a command over a diagnostic communication link or the like. The ABS lamp begins flashing at a first predetermined frequency (e.g., twice a second or some other predetermined frequency) to indicate the MLAT is active and the processor is looking for wheel speeds. The driver begins to drive the vehicle forward slowly, accelerating smoothly. Once the ABS lamp stops flashing and remains steadily lit, the vehicle speed is acceptable for the MLAT, and the sensor airgaps are automatically evaluated. To the extent possible, the driver maintains a steady speed throughout the test. Once the test is complete, the ABS lamp turns off if none of the wheels have marginally large airgaps. If the ABS lamp remains illuminated, and the ESP lamp begins to flash, one or more wheels have been identified to have marginally large airgaps. FIG. 2 illustrates blink codes and interpretation details. The identified wheel-end(s) can then be inspected. To exit the test at any time, the driver cycles ignition power or drives the vehicle over a predetermined upper speed limit for the MLAT (e.g., 10 mph or the like).

The ABS lamp remains steadily lit, while the ESP lamp blinks according to the wheel positions that have been identified with marginally-large airgaps. In the example of FIG. 2, two blinks correspond to an airgap issue on the steer-right wheel-end. After a pause, the ESP lamp follows with one blink to correspond to an airgap issue on the steer-left wheel-end.

Figure 3:
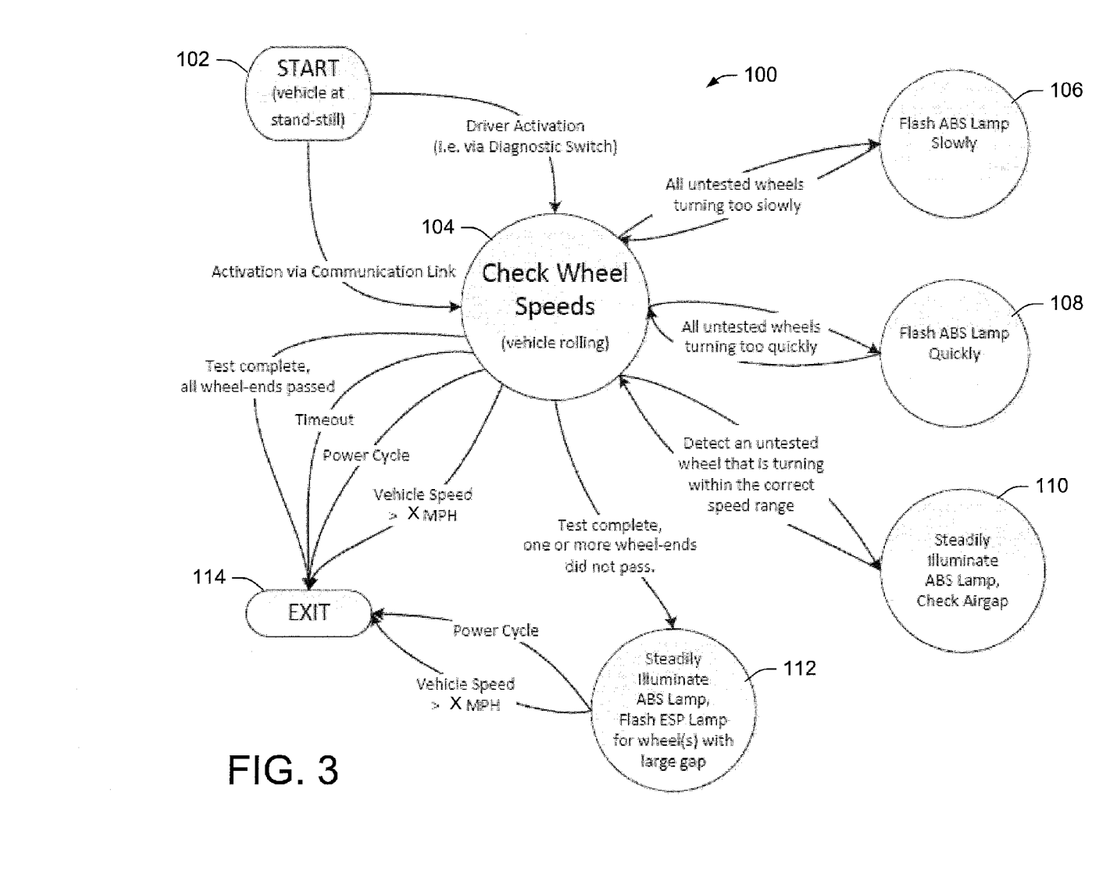
FIG. 3 illustrates a state diagram of the stand-alone, all-wheel, marginally large airgap test (AWMLAT), in accordance with one or more features described herein.

FIG. 3 illustrates a state diagram 100 of the stand-alone, all-wheel, marginally large airgap test (AWMLAT), in accordance with one or more features described herein. The airgap test begins at 102, with the vehicle at a standstill. The test is activated by the driver (e.g., via a diagnostic switch or the like), or via a diagnostic communication link. At 104 wheel speeds are checked, with the vehicle moving. Several parameters are then checked and their status is expressed by the ABS lamp. For example, if all untested wheels are turning too slowly (e.g., below a predetermined lower speed limit), then at 106 the ABS lamp is flashed slowly (e.g. at 2 Hz or the like). If all untested wheels are turning too quickly (e.g., above a predetermined upper speed limit), then at 108 the ABS lamp is flashed quickly (e.g. at 5 Hz or the like). If an untested wheel is determined to be turning within the correct speed range (e.g., between the lower speed limit and the upper speed limit) then at 110 the ABS lamp is steadily illuminated and the airgap for that wheel is evaluated.

When the test is complete, if one or more wheel ends did not pass, then at 112 the ABS lamp is steadily illuminated in the ESP lamp is flashed to identify wheels determined to have an unacceptably large airgap. The ESP indicator light remains unlit if no wheel end is identified as having a marginally large airgap (i.e., if all wheel ends have passed the test). To exit the test at 114 the driver can cycle ignition power a predetermined number of times (e.g. 5 or the like), or can accelerate the vehicle until it exceeds a predetermined speed of X mph, (e.g. 10 mph or the like). Additionally, the test is exited 114 automatically upon completion if all wheel ends pass, if the test times, if the ignition power is cycled, and/or if the vehicle speed exceeds X mph.

It will be appreciated that the MLAT can also be used in an end-of-line test operation with wheel-end marginally large airgap test (WEMLAT). In this example, the MLAT can also be used with a roller-bed dynamometer as part of an end-of-line (EOL) test station. In the WEMLAT mode, the airgap of each wheel may be individually checked in response to a prompt over a diagnostic link such as J1939. The ABS system need not control the ABS or ESP lamps to display test status information in the WEMLAT mode. The test status and reporting information can be communicated solely over the diagnostic link.

Figure 4:
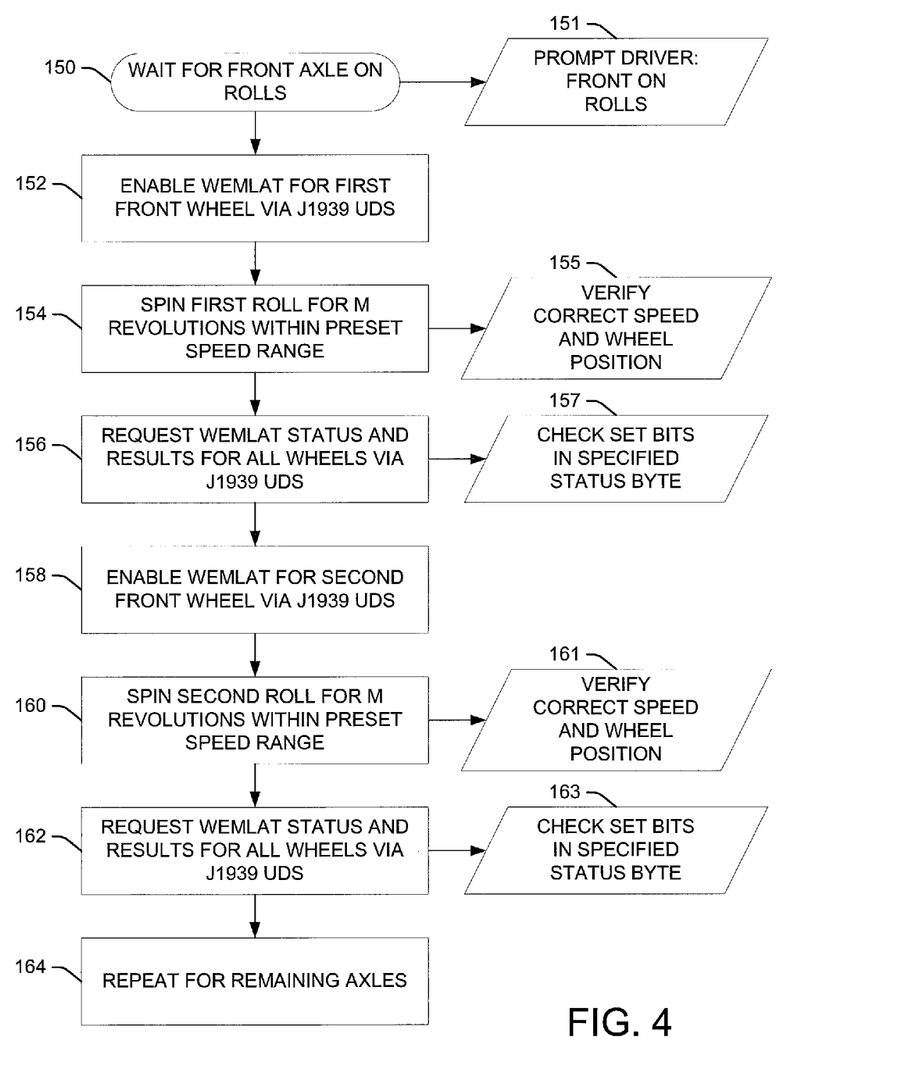
FIG. 4 illustrates a method for performing the WEMLAT test sequence, for example with a vehicle end of line test station, in accordance with one or more aspects described herein.

FIG. 4 illustrates a method for performing the WEMLAT test sequence, for example with a vehicle end of line test station, in accordance with one or more aspects described herein. At 150, the test is ready for initiation and the system is waiting for the front axle of the vehicle to be positioned on the rollers. At 151, the driver is prompted to drive the vehicle forward until the front axle rests on the rollers. At 152, the WEMLAT is enabled for the first front wheel (e.g., the right front wheel) on the front axle via the J1939 bus. At 154, the first roller is spun for M revolutions within a preset speed range (e.g. 2 mph to 4 mph or the like), where M is an integer (e.g., 2 or the like). At 155, speed and wheel position are verified. At 156, WEMLAT status and results are requested for all wheels via the J1939 bus. At 157, a predetermined byte of the returned status and results information is evaluated to identify set bits within the byte. For example, if bit 0 is set (i.e. has a binary value of 1), then the test is complete; if bit 1 is set, then the test timed out; if bit 7 is set, then the wheel being tested passed the airgap test; etc.

At 158, the WEMLAT is enabled for the second front wheel (e.g., the left front wheel) by the J1939 bus. At 160, the second roller is spun for M revolutions within the preset speed range. At 161, correct wheel position and speed are verified. At 162, WEMLAT status and results are requested for all wheels via the J1939 bus. At 163, a predetermined byte of the returned status and results information is evaluated to identify set bits within the byte. At 164, the method is repeated for remaining vehicle axles.

Figure 5:
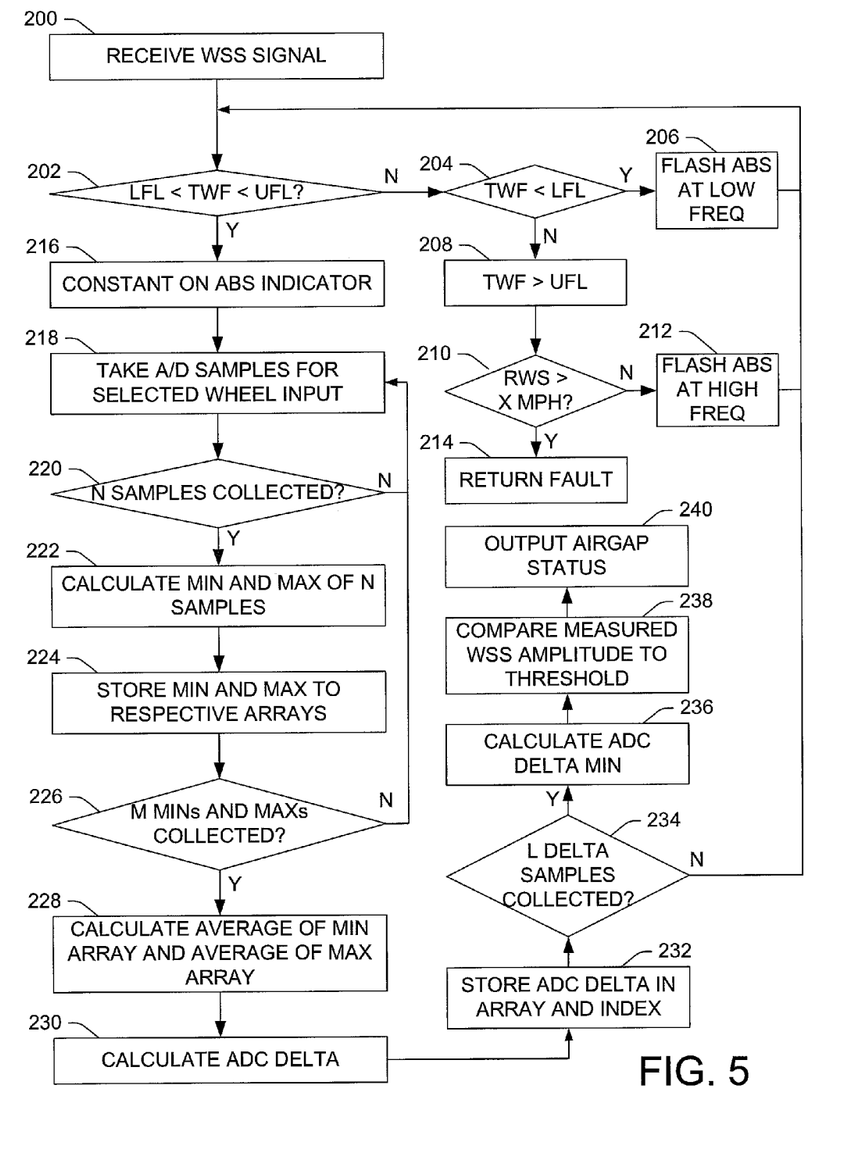
FIG. 5 illustrates a method for performing wheel end sensor output amplitude measurement, in accordance with one or more features described herein.

FIG. 5 illustrates a method for performing wheel end sensor output amplitude measurement, in accordance with one or more features described herein. At 200, wheel speed sensor signal is received. At 202, a determination is made regarding whether the exciter ring frequency is between a lower frequency limit and upper frequency limit. If not, then at 204, a determination is made regarding whether the exciter ring frequency is below the lower frequency limit. If the exciter ring frequencies below the lower frequency limit, then at 206, the ABS indicator lamp is flashed a low frequency (e.g. 2 Hz, 3 Hz, or the like), and the method reverts back to 202 for continued monitoring of exciter ring frequency. If the exciter ring frequency is determined not to be less than the lower frequency limit at 204, then at 208 it is determined that the exciter ring frequency is greater than the upper frequency limit. At 210 a determination is made regarding whether the reference wheel speed is greater than a predetermined speed of X mph (e.g. 10 mph or the like). If the reference wheel speed is not greater than the determined speed then at 212 the ABS indicator light is flashed at high frequency (e.g. 5 Hz, 6 Hz, etc.) and the method reverts to 202 for continued monitoring of the exciter ring frequency. If the reference wheel speed is determined to be greater than the predetermined speed at 210, then at 214, a fault is returned and the test is exited.

If the determination at 202 indicates that exciter ring frequency is within the prescribed limits (i.e. between the lower frequency limit and the upper frequency limit), then at 216 the ABS indicator lamp is steadily lit. At 218 analog to digital sampling is performed for selected wheel input. At 220 determination is made regarding whether a predetermined number N (e.g. 16 or the like) of samples has been collected. If not, then the method reverts to 218 for continued sampling. If N samples have been collected, then at 222 a minimum (MIN) and maximum (MAX) of the N samples is calculated. At 224, the MIN and MAX are stored to respective MIN and MAX arrays. At 226, a determination is made regarding whether a predetermined number P (e.g., 10 or the like) of MINs and MAXs has been collected. If not, then the method reverts to 218 for continued sampling. If the predetermined number of MINs and MAXs has been collected, then at 228 and average of the MIN array and an average of the MAX array is calculated. The MIN average is subtracted from the MAX average to determine a difference or delta the analog-to-digital conversion (ADC) MAX and MIN averages, at 230. At 232, the ADC delta value is stored and indexed in a Delta array. At 234, a determination is made regarding whether any predetermined number Q (e.g. 10 or the like) of Delta values has been collected. If not then the method reverts to 202 for additional iterations. If the predetermined number Q of Delta values has been collected in at 236, an ADC delta MIN is calculated, which represents the measured wheel speed sensor peak amplitude. At 238, the measured wheel speed sensor peak amplitude is compared to a predetermined minimum amplitude threshold that corresponds to a maximum allowable airgap, such that if the measured wheel speed sensor peak amplitude is below the predetermined minimum amplitude threshold then the wheel end is determined to have a marginally or unacceptably large airgap. At 240, airgap status for the wheel and is output, to indicate to the user whether the wheel end airgap is unacceptably large.

Figure 6:
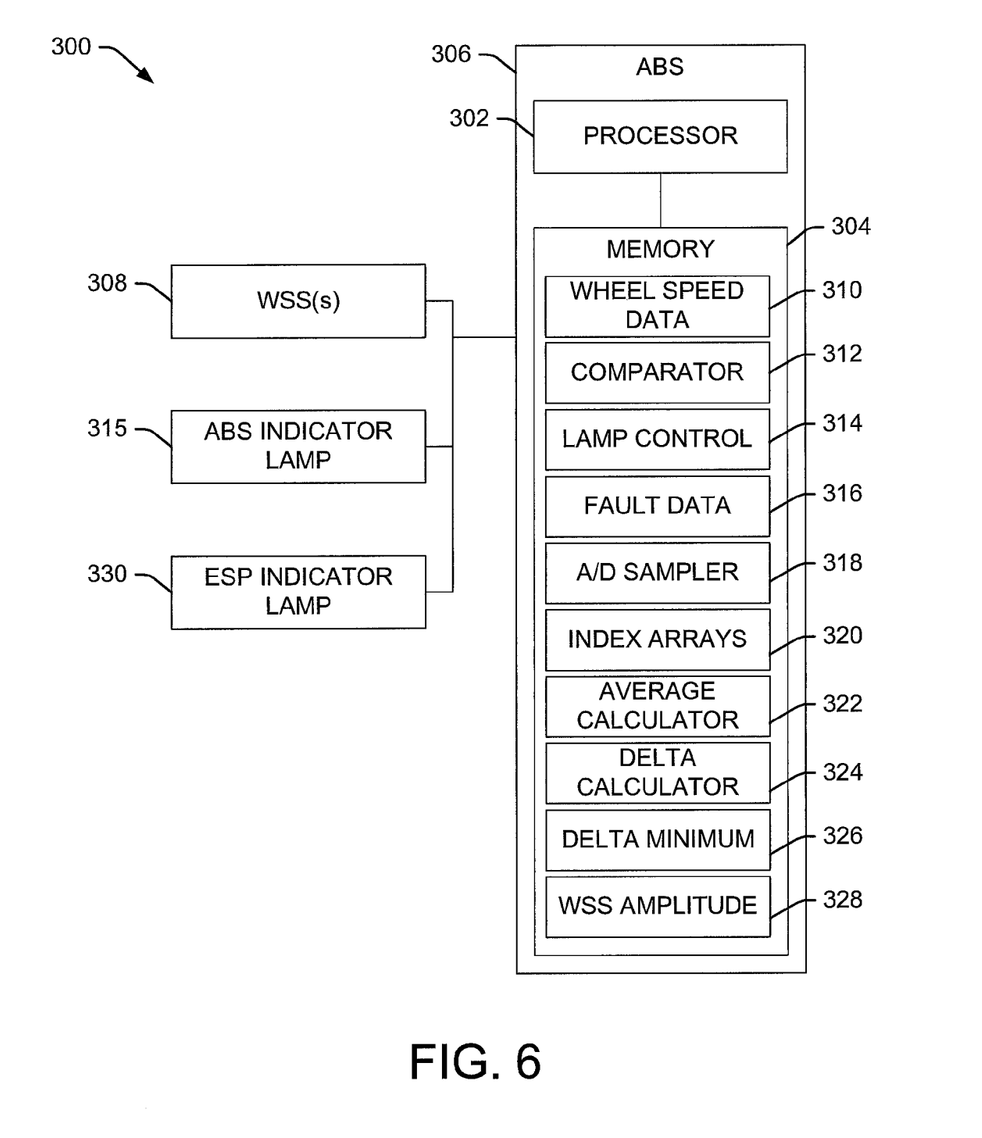
FIG. 6 illustrates a system that facilitates performing wheel end sensor output amplitude measurement, in accordance with one or more features described herein.

FIG. 6 illustrates a system that facilitates performing wheel end sensor output amplitude measurement, in accordance with one or more features described herein. The system comprises a processor comprising a processor 302 that executes, and a memory 304 that stores, computer-executable instructions (e.g., modules, routines, programs, applications, etc.) for performing the various methods, techniques protocols, etc., described herein.

The memory 304 may include volatile, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 302. Additionally, "module," as used herein denotes a set of computer-executable instructions (e.g., a routine, sub-routine, program, application, or the like) that is persistently stored on the computer-readable medium or memory for execution by the processor, and/or a processor configured to execute the instructions to provide the described function.

An antilock brake system (ABS) 306 comprises the processor 302 and memory 304, and is coupled to at least one wheel speed sensor (WSS) 308. Wheel speed data 310 is received from the WSS and stored in the memory. A comparator 312 compares exciter ring frequency to upper and lower frequency limits to determine whether the exciter ring frequency is between the lower frequency limit and upper frequency limit. If the exciter ring frequency is below the lower frequency limit, then a lamp control module 314 is executed by the processor to flash an ABS indicator lamp 315 at a low frequency (e.g. 2 Hz, 3 Hz, or the like). If the exciter ring frequency is determined to be greater than the upper frequency limit, the comparator compares wheel speed to a predetermined speed threshold to determine whether the reference wheel speed is greater than the predetermined speed threshold. If the reference wheel speed is not greater than the predetermined speed threshold, then the lamp control module flashes the ABS indicator light at higher frequency (e.g. 5 Hz, 6 Hz, etc.). If the reference wheel speed is determined to be greater than the predetermined speed threshold then a fault 316 is returned and the measurement test is exited.

If the comparator determines that exciter ring frequency is within the prescribed limits (i.e. between the lower frequency limit and the upper frequency limit), then the lamp control module steadily lights the ABS indicator lamp. An analog to digital sampler module 318 performs A/D sampling on a selected wheel input. In one embodiment, the sampler 318 samples the A/D output periodically (e.g., every 10 ms or the like), and upon test initiation increases the sampling rate (e.g., to every 2.5 ms or the like). Once a predetermined number (e.g. 16 or the like) of samples has been collected the processor calculates a minimum (MIN) and maximum (MAX) of the N samples, which are stored to respective MIN and MAX arrays stored as part of a plurality of arrays 320. Once a predetermined number (e.g., 10 or the like) of MINs and MAXs has been collected, an average of the MIN array and an average of the MAX array are calculated by an average calculator module 322. A delta calculator 324 subtracts the MIN average from the MAX average to determine a difference or delta of the analog-to-digital conversion (ADC) MAX and MIN averages, and the delta value is stored and indexed as an array 320. Once a predetermined number (e.g. 10 or the like) of delta values has been collected, the delta calculator calculates a delta MIN 326, which is stored to memory and represents the measured wheel speed sensor peak amplitude. The measured wheel speed sensor amplitude 328 is compared to a threshold to determine if the amplitude represents a large air gap. The system also includes an ESP indicator lamp 330 that is controlled by the lamp control module to indicate wheel speed sensor airgap magnitude as a function of the measured WSS peak amplitude, in order to indicate to a driver whether the airgap is larger than desired.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A method for performing an all-wheel marginally large airgap test (AWMLAT), comprising:
    upon test initiation, receiving a signal from each of a plurality of wheel speed sensors on a vehicle, the signal being indicative of a exciter ring sensed by the sensor;
    for each wheel speed sensor:
        monitoring exciter ring frequency to determine whether exciter ring frequency is within a predetermined frequency range;
        when exciter ring frequency is within the predetermined frequency range, measuring wheel speed sensor signal peak amplitude;
        comparing the measured wheel speed sensor signal peak amplitude to a predetermined minimum amplitude that represents the maximum allowable airgap between the wheel speed sensor and the exciter ring; and
        identifying wheel ends for which the wheel speed sensor signal peak amplitude is less than the predetermined minimum amplitude as having an airgap that is larger than a predetermined acceptable airgap size.

2. The method according to claim 1, wherein the predetermined acceptable airgap size is less than about 0.03 inches.

3. The method of claim 1, wherein test initiation occurs upon receiving at least one of:
    an indication that an antilock brake system diagnostic switch has been toggled a predetermined number of times; and
    a test initiation command received over a diagnostic communication link.

4. The method according to claim 1, further comprising:
    when the exciter ring frequency is below a lower frequency limit of the predetermined frequency range, flashing an antilock brake system indicator light at a first frequency to instruct a driver to accelerate the vehicle; and
    when the tone wheel frequency is above an upper frequency limit of the predetermined frequency range, determining whether the speed of the wheel coupled to the tone wheel is greater than a predetermined threshold speed.

5. The method according to claim 4, further comprising:
    when the wheel speed is not greater than the predetermined threshold speed, flashing an antilock brake system indicator light at a second frequency, which is higher than the first frequency, to instruct a driver to decelerate the vehicle; and
    when the wheel speed is greater than the predetermined threshold speed, terminating the test.

6. The method according to claim 4, wherein the predetermined threshold speed is at least 10 mph.

7. The method according to claim 1, further comprising:
    causing an antilock brake system indicator light to remain steadily illuminated when the exciter ring frequency within the predetermined frequency range to instruct a driver to maintain a constant speed.

8. The method according to claim 1, further comprising:
    indicating the identified wheel ends to the user by flashing an electronic stability program (ESP) indicator light, wherein each wheel end is associated with a unique blink code sequence that is output when the wheel end is determined to have a marginally large airgap, and wherein the ESP indicator light remains unlit if no wheel end is identified as having a marginally large airgap.

9. A processor that executes an all-wheel marginally large airgap test (AWMLAT), wherein the processor is configured to:
    upon test initiation, receive a signal from each of a plurality of wheel speed sensors on a vehicle, the signal being indicative of a exciter ring sensed by the sensor; and
    for each wheel speed sensor:
        monitor exciter ring frequency to determine whether exciter ring frequency is within a predetermined frequency range;
        when exciter ring frequency is within the predetermined frequency range, measure wheel speed sensor signal peak amplitude;
        compare the measured wheel speed sensor signal peak amplitude to a predetermined minimum amplitude that represents the maximum allowable airgap between the wheel speed sensor and the exciter ring; and
        identify wheel ends for which the wheel speed sensor signal amplitude is less than the predetermined minimum amplitude as having an airgap that is larger than a predetermined acceptable airgap size.

10. The processor according to claim 9, wherein the predetermined acceptable airgap size is less than about 0.03 inches.

11. The processor of claim 9, wherein the processor is further configured to initiate the test upon receiving: at least one of:

an indication that an antilock brake system diagnostic switch has been toggled a predetermined number of times; and an initiation command received over a diagnostic communication link.

12. The processor according to claim 9, wherein the processor is further configured to:

when the exciter ring frequency is below a lower frequency limit of the predetermined frequency range, flash an antilock brake system indicator light at a first frequency to instruct a driver to accelerate the vehicle; and when the tone wheel frequency is above an upper frequency limit of the predetermined frequency range, determine whether the speed of the wheel coupled to the tone wheel is greater than a predetermined threshold speed.

13. The processor according to claim 12, wherein the processor is further configured to:

when the wheel speed is not greater than the predetermined threshold speed, flash an antilock brake system indicator light at a second frequency, which is higher than the first frequency, to instruct a driver to decelerate the vehicle; and when the wheel speed is greater than the predetermined threshold speed, terminate the test.

14. The processor according to claim 12, wherein the predetermined threshold speed is at least 10 mph.

15. The processor according to claim 9, wherein the processor is further configured to:

steadily illuminate an antilock brake system indicator light when the exciter ring frequency within the predetermined frequency range in order to instruct a driver to maintain a constant speed.

16. The processor according to claim 9, further comprising preconditioning the wheel speed sensor signal by passing the signal through a low pass filter.

17. The system according to claim 9, wherein the processor is further configured to:

indicate the identified wheel ends to the user by flashing an electronic stability program (ESP) indicator light, wherein each wheel end is associated with a unique blink code sequence that is output when the wheel end is determined to have a marginally large airgap; and wherein the ESP indicator light remains unlit if no wheel end is identified as having a marginally large airgap.

18. A system that facilitates performing an all-wheel marginally large airgap test (AWMLAT), comprising:

an antilock brake system comprising
a plurality of wheel speed sensors that respectively monitor a plurality of exciter rings; and
an indicator light; and a processor configured to, upon test initiation, receive a signal from each of a plurality of wheel speed sensors on a vehicle, the signal being indicative of a exciter ring sensed by the sensor;

wherein the processor is further configured to, for each wheel speed sensor:

monitor exciter ring frequency to determine whether exciter ring frequency is within a predetermined frequency range;

when exciter ring frequency is within the predetermined frequency range, measure wheel speed sensor signal peak amplitude;

compare the measured wheel speed sensor signal peak amplitude to a predetermined minimum amplitude that represents the maximum allowable airgap between the wheel speed sensor and the exciter ring; and identify wheel ends for which the wheel speed sensor signal peak amplitude is less than the predetermined minimum amplitude as having an airgap that is larger than a predetermined acceptable airgap size.

19. The system according to claim 18, wherein the processor is further configured to:

when the exciter ring frequency is below a lower frequency limit of the predetermined frequency range, flash the antilock brake system indicator light at a first frequency; and when the tone wheel frequency is above an upper frequency limit of the predetermined frequency range, determine whether the speed of the wheel coupled to the tone wheel is greater than a predetermined threshold speed.

20. The system according to claim 19, wherein the processor is further configured to:

when the wheel speed is not greater than the predetermined threshold speed, flash the antilock brake system indicator light at a second frequency, which is higher than the first frequency; and when the wheel speed is greater than the predetermined threshold speed, terminate the test.

21. The system according to claim 20, wherein the processor is further configured to:

steadily illuminate the antilock brake system indicator light when the exciter ring frequency within the predetermined frequency range.

22. The system according to claim 18, further including a plurality of low pass filters, each filter being positioned in-line a respective wheel speed sensor and the processor.

23. The system according to claim 18, wherein the processor is further configured to:

indicate the identified wheel ends to the user by flashing an electronic stability program (ESP) indicator light, wherein each wheel end is associated with a unique blink code sequence that is output when the wheel end is determined to have a marginally large airgap, and wherein an absence of EPS indicator illumination indicates that no wheel end is identified as having a marginally large airgap.

24. An apparatus that facilitates performing an all-wheel marginally large airgap test (AWMLAT), comprising:

receiving means for receiving a signal from each of a plurality of wheel speed sensors on a vehicle, the signal being indicative of a exciter ring sensed by the sensor; and for each wheel speed sensor:

monitoring means for monitoring exciter ring frequency to determine whether exciter ring frequency is within a predetermined frequency range;

measuring means for, when exciter ring frequency is within the predetermined frequency range, measuring wheel speed sensor signal peak amplitude;

comparing means for comparing the measured wheel speed sensor signal amplitude to a predetermined minimum peak amplitude that represents the maximum allowable airgap between the wheel speed sensor and the exciter ring; and identifying means for identifying wheel ends for which the wheel speed sensor signal amplitude is less than the predetermined minimum peak amplitude as having an airgap that is larger than a predetermined acceptable airgap size.

25. A method for performing wheel-end marginally large airgap test (WEMLAT), comprising for each wheel on a vehicle:
- spinning a roller under the wheel for a predetermined number of revolutions within a preset speed range;
- measuring wheel speed sensor output during spinning;
- requesting status and results for all wheels;
- receiving status and result data;
- checking a predetermined status byte in the received data to determine the status of an airgap between the wheel speed sensor and an exciter ring coupled to the first wheel; and
- outputting to a user an indication of any wheels having an airgap that is larger than a predetermined allowable airgap threshold size.

26. The method according to claim 25, wherein the predetermined number of revolutions is at least 2.

27. The method according to claim 25, wherein the preset speed range is between 2.5 mph and 10 mph.

28. The method according to claim 25, wherein the output indication is provided to the user by blinking an electronic stability program (ESP) indicator light, wherein each wheel is assigned a unique blink sequence and wherein each wheel having an airgap larger than the predetermined allowable airgap threshold size is indicated by blinking the indicator light in the unique blink sequence for that wheel, and wherein the ESP indicator light remains unlit if no wheel is determined to have an airgap larger than the predetermined allowable airgap threshold size.

* * * * *